(12) United States Patent
Schmid

(10) Patent No.: US 11,237,060 B2
(45) Date of Patent: Feb. 1, 2022

(54) OPTOELECTRICAL CHIP

(71) Applicant: FOS4X GMBH, Munich (DE)

(72) Inventor: Markus Schmid, Munich (DE)

(73) Assignee: FOS4X GMBH, Munich (DE)

( * ) Notice: Subject to any disclaimer, the term of this patent is extended or adjusted under 35 U.S.C. 154(b) by 0 days.

(21) Appl. No.: 16/643,525

(22) PCT Filed: Aug. 10, 2018

(86) PCT No.: PCT/EP2018/071790
§ 371 (c)(1),
(2) Date: Feb. 28, 2020

(87) PCT Pub. No.: WO2019/042748
PCT Pub. Date: Mar. 7, 2019

(65) Prior Publication Data
US 2020/0300709 A1    Sep. 24, 2020

(30) Foreign Application Priority Data

Aug. 29, 2017 (DE) .......................... 102017119810.5

(51) Int. Cl.
*G01N 21/25* (2006.01)
*G01J 9/02* (2006.01)
(Continued)

(52) U.S. Cl.
CPC ............... *G01J 9/0246* (2013.01); *G01J 3/26* (2013.01); *G01J 2003/1213* (2013.01)

(58) Field of Classification Search
CPC .... G01J 9/0246; G01J 3/26; G01J 3/28; G01J 3/51; G01J 3/4531; G01J 2003/1213;
(Continued)

(56) References Cited

U.S. PATENT DOCUMENTS 6,094,446 A * 7/2000 Tei .................. H01S 5/0687
                                              372/32
6,122,301 A * 9/2000 Tei .................. H01S 5/0687
                                              372/20
(Continued)

FOREIGN PATENT DOCUMENTS

DE        10061147 A1    6/2002
JP        S55142220 A    11/1980
WO        WO-0225232 A2   3/2002

OTHER PUBLICATIONS

International Search Report and Written Opinion for application No. PCT/EP2018/071790, dated Nov. 21, 2018.

*Primary Examiner* — Tarifur R Chowdhury
*Assistant Examiner* — Jonathon Cook
(74) *Attorney, Agent, or Firm* — Moser Taboada

(57) ABSTRACT

The invention relates to an optoelectronic chip comprising the following elements: a light inlet; a wavelength-sensitive optical filter; a first photoelectric element for measuring a first light intensity, particularly a first photodiode, the first photoelectric element being arranged such that light penetrating the optoelectronic chip via the light inlet, transmitted by the filter, hits the first photoelectric element; and a second photoelectric element for measuring a second light intensity, particularly a second photodiode, the second photoelectric element being arranged such that the light penetrating the optoelectronic chip via the light inlet, which is reflected by the filter, hits the second photoelectric element.

11 Claims, 3 Drawing Sheets

(51) Int. Cl.
*G01J 3/26* (2006.01)
*G01J 3/12* (2006.01)

(58) Field of Classification Search
CPC ... G01J 3/2803; G01D 5/353; G01D 5/35316; G01M 11/0285; G01M 11/30; G01M 11/33; G01M 11/335; G01M 11/331; G01K 11/3206; G01L 1/242; G01L 1/246
See application file for complete search history.

(56) References Cited

U.S. PATENT DOCUMENTS

| | | | |
|---|---|---|---|
| 6,975,812 B1* | 12/2005 | Kuhara | H04B 10/071 356/73.1 |
| 2002/0093657 A1* | 7/2002 | Friberg | G01J 9/00 356/419 |
| 2003/0231841 A1* | 12/2003 | Nakanishi | G02B 6/4265 385/92 |
| 2006/0126055 A1* | 6/2006 | Meneely | G01S 17/58 356/28.5 |
| 2010/0140460 A1* | 6/2010 | Rigneault | G01N 21/6452 250/226 |
| 2014/0253927 A1* | 9/2014 | Uchida | G01N 29/2418 356/484 |
| 2015/0076507 A1* | 3/2015 | Hertkorn | H01L 33/32 257/76 |
| 2016/0047763 A1* | 2/2016 | Omichi | G01N 25/00 374/161 |
| 2016/0116403 A1* | 4/2016 | Lear | G01M 11/33 356/70 |
| 2017/0093488 A1* | 3/2017 | Wang | G02B 6/4292 |
| 2018/0067327 A1* | 3/2018 | Peng | G03B 33/12 |
| 2018/0171778 A1* | 6/2018 | Hoehn | E21B 47/07 |
| 2018/0356263 A1* | 12/2018 | Nielsen | G01D 5/35374 |

\* cited by examiner

OPTOELECTRICAL CHIP

TECHNICAL FIELD

Embodiments of the disclosure relate to an optoelectrical chip, a measurement system including an optoelectrical chip, as well as a method for evaluating a reflection spectrum of a fiber Bragg grating that uses an optoelectrical chip.

In measurement-technological applications using light, it is in many cases required for a reflection spectrum or a transmission spectrum of the light used for measurement to be evaluated. For example, light is influenced by optical elements in its spectral properties, e.g. by optical gratings such as fiber Bragg gratings, and the spectral properties of the light that had been subjected to such an influence are evaluated. The spectral properties of the light comprise, for example, a wavelength-dependent intensity minimum or maximum.

STATE OF THE ART

Optoelectrical chips are known, on or in which optical elements and electric or electronic elements are arranged and interconnected in the form of a mixed optical and electrical system, typically on or in a common wafer for the respective optical and electric/electronic elements.

FIG. 4 shows an example of a conventional optoelectrical chip 101. Into the chip 101, an optical waveguide 110 is inserted, the inserted end of which forms a light inlet opening 111 for entering light 150. The entering light 150, for example, is light which had been changed in its spectral properties on its propagation path from a light source (not shown) to the light inlet opening 111, wherein some or all of the further elements of the chip 101 serve to measure spectral properties of interest or spectral property changes. Typically, a wavelength-related maximum of the intensity of the entering light 150 was influenced or shifted by a fiber Bragg grating (not shown) which is formed in the optical waveguide 110.

The light 150 entered into the chip 101 is divided into a first light fraction 151 and a second light fraction 152 by a beam splitter 120. The first light fraction 151 subsequently passes an optical filter 130 in its transmission, which filter performs a wavelength-dependent filtering of the light. The filtered light 153 exiting the optical filter 130 hits a filter photodiode 140 where it generates an electric measurement signal depending on its intensity.

The second light fraction 152 hits a reference photodiode 160 where it generates an electric reference signal depending on its intensity. The second light fraction 152 is unfiltered. The value of the measurement signal is divided by the value of the reference signal, for example, in an evaluation circuit (not shown). Via a calibrating model of the optical filter 130, the wavelength of the fiber Bragg grating within the optical waveguide 110 may be deduced from the thus obtained quotient.

The optoelectrical chip 101 is of a relatively complex structure inter alia due to the beam splitter 120, and the sensitivity is low due to the beam splitter 120. A solution is desirable, in which the complexity of an optoelectrical chip 101 is reduced and/or the sensitivity is improved.

SUMMARY

Embodiments of the present disclosure provide an optoelectrical chip having the features of claim 1. Further, embodiments of the present disclosure propose a measurement system having the features of claim 8 which uses an optoelectrical chip disclosed herein. Furthermore, embodiments of the present disclosure provide a method having the features of claim 9 for evaluating a reflection spectrum of a fiber Bragg grating, in which method an optoelectrical chip disclosed herein is used.

According to an embodiment, an optoelectrical chip comprising the following elements is proposed: a light inlet opening; a wavelength-sensitive optical filter; a first photoelectric element for measuring a first light intensity, particularly a first photodiode; the first photoelectric element being arranged such that light entering into the optoelectrical chip via the light inlet opening, which is transmitted by the filter, hits the first photoelectric element; and a second photoelectric element for measuring a second light intensity, particularly a second photodiode, the second photoelectric element being arranged such that light entering into the optoelectrical chip via the light inlet opening, which is reflected at the filter, hits the second photoelectric element.

A measurement system disclosed herein features an optoelectrical chip described herein, and an optical waveguide coupled to the light inlet opening, the optical waveguide comprising at least one fiber Bragg grating.

A method for evaluating a reflection spectrum of a fiber Bragg grating, the fiber Bragg grating being provided in an optical waveguide, and an end of the optical waveguide being inserted in the light inlet opening of an optoelectrical chip described herein, comprises: measuring a transmission intensity of the light having entered via the light inlet opening and having passed the optical filter, by means of the first photoelectric element; measuring a reflection intensity of the light having entered via the light inlet opening and having been reflected at the optical filter, by means of the second photoelectric element; dividing the transmission intensity by the reflection intensity to obtain a ratio value; and relating the ratio value to a model of the optical filter to obtain a value associated with the reflection spectrum.

The filter element, i.e. the wavelength-sensitive optical filter accordingly is utilized both in transmission and reflection. The light reflected at the filter element is used directly to measure a reference intensity. The filter surface thus functions as a beam splitter.

The light having entered via the light inlet opening and having passed the optical filter, together with the light having entered via the light inlet opening and having been reflected at the optical filter, is subject to energy conservation. The fact that no separate beam splitter or a similar optical element attenuating the light intensity is used, the efficiency of the optoelectrical chip described herein is doubled as compared to a conventional optoelectrical chip.

The saved beam splitter element moreover reduces manufacturing costs, for example, material costs and possible labor costs in manufacturing the chip.

The transmission function regarding wavelength, which is present at the first photoelectric element, is applied to the second photoelectric element in a wavelength-inverse manner. A division of the two intensities measured at the respective photoelectric elements, therefore may result in an improved signal-to-noise ratio.

In embodiments of the optoelectrical chip, the measurement system and/or the method, the optical filter is a wavelength-sensitive transmission filter or an edge filter.

In embodiments of the optoelectrical chip, the measurement system and/or the method, a reflection surface of the optical filter is inclined relative to the propagation direction of the light entering into the optoelectrical chip via the inlet opening, in particular within an angular range from 10° to 80° relative to a perpendicular orientation of the reflection surface with respect to the propagation direction.

An inclination of the reflection surface of the optical filter can enable the second photoelectric element to be arranged in or on the optoelectrical chip in a space-saving manner, for example, adjacent to an inserted optical waveguide.

In embodiments of the optoelectrical chip, the measurement system and/or the method, the light path from the light inlet opening to the filter, the light path from the filter to the first photoelectric element, and the light path from the filter to the second photoelectric element each are free from further optical elements. The intensity of the light whose spectral properties are assessed in the optoelectrical chip, is therefore not subjected to any significant attenuation which occurs, for example, in a separately provided beam splitter. Thus, the sensitivity can be improved.

In embodiments of the optoelectrical chip, the measurement system and/or the method, the optoelectrical chip further comprises an evaluation circuit. A first measurement signal from the first photoelectric element and a second measurement signal from the second photoelectric element are supplied to the evaluation circuit. The respective values of the measurement signals are associated with the respective measured light intensities. The evaluation circuit is configured to divide the value of the first measurement signal by the value of the second measurement signal in order to obtain a ratio value.

An evaluation circuit integrated with the optoelectrical chip may contribute to a further simplification and/or compaction in an optoelectrical measurement system.

Typically, the evaluation circuit is configured to relate the ratio value to a model of the optical filter so as to obtain a value associated with a spectrum of the light entering via the light inlet opening. The value, for example, indicates a frequency-dependent intensity maximum or an intensity minimum of the light entering via the light inlet opening. The model of the optical filter typically is a model suitable for calibrating purposes of the filter. A calibrating model of the optical filter typically comprises a look-up table. The ratio value e.g. allows for a wavelength or wavelength shift of a fiber Bragg grating formed in the optical waveguide to be deduced.

BRIEF DESCRIPTION OF THE DRAWINGS

Embodiments of the invention are illustrated in the drawings and explained in more detail in the description below. Shown are in the Figures.

Hereinafter, embodiments of the invention will be explained in more detail. The drawings serve to illustrate one or more examples of embodiments of the invention.

Figure 1:
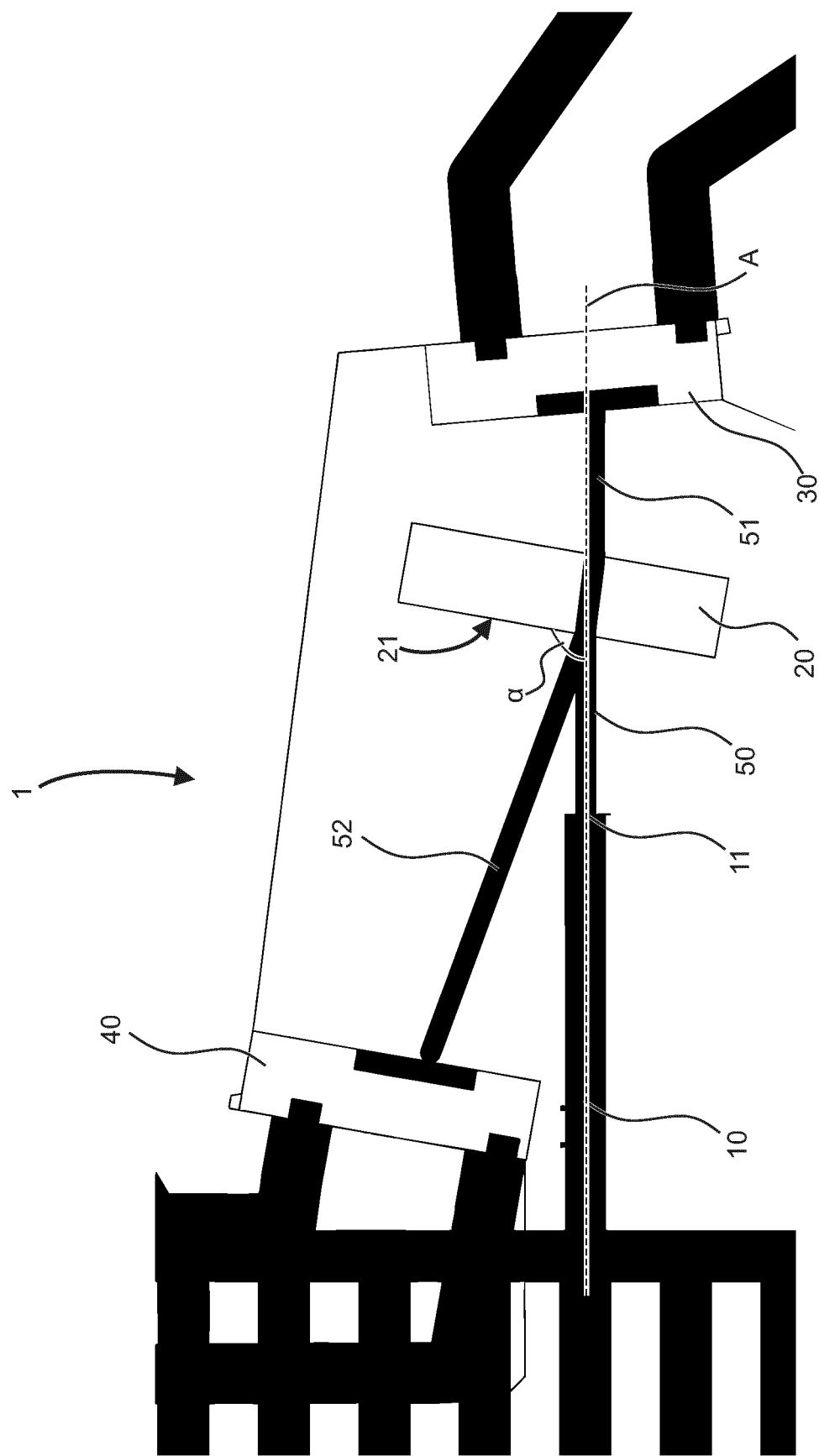
FIG. 1 a schematic representation of an optoelectrical chip according to one embodiment, with an optical waveguide being inserted.

FIG. 1 shows a schematic representation of an optoelectrical chip, as a whole designated by 1, according to one embodiment. Into the optoelectrical chip 1, an end of an optical waveguide 10 is inserted, and the chip 1 and the optical waveguide 10 together build a measurement system by means of which a reflection spectrum of a fiber Bragg grating (not shown), which is formed in the optical waveguide 10, can be evaluated, for example.

An end face of the inserted end of the optical waveguide 10 serves to couple light into the optoelectrical chip 1. In the present embodiment, this end face represents a light inlet opening 11 for light 50 entering into the optoelectrical chip 1. It is also possible for a light inlet opening 11 to be provided in another configuration and to couple the optical waveguide 10 or the end face thereof in a corresponding way to such a light inlet opening 11 so that the entering light 50 may propagate within the optoelectrical chip 1. The chip 1 forms a free beam optoelectrical system in this respect.

The entering light 50 propagates along a propagation direction A and hits an optical transmission filter 20 which is wavelength-sensitive and only allows spectral fractions of the light 50 to pass as transmitted light 51. The non-transmitted fraction of the light 50 is reflected at a reflection surface 21 of the optical filter 20.

In the illustrated embodiment, at least the reflection surface 21 of the optical filter 20 is inclined relative to the propagation direction A. The reflected light 52, i.e. the fraction of the light 50 that has not been allowed to pass as transmitted light 51, accordingly propagates in a direction resulting due to the inclination angle $\alpha$ of the reflection surface 21. An example of an angular range of the inclination angle $\alpha$ of the reflection surface 21 is a range between 10° and 80°.

The transmitted light 51 hits a first photoelectric element 30 which is formed, for example, as a first photodiode. Further examples of a first photoelectric element 30 comprise a phototransistor or another photosensitive semiconductor component. The transmitted light 51 generates an electrical signal in the first photoelectric element 30 depending on the intensity. The electrical signal is output—if necessary amplified—from the first photoelectric element 30 as a first measurement signal 61 which will be further explained with reference to FIG. 2.

The reflected light 52 hits a second photoelectric element 40, which in turn is formed, for example, as a second photodiode. Here, as well, further examples of a second photoelectric element 40 comprise a phototransistor or another photosensitive semiconductor component. Again, the reflected light 52 generates an electrical signal in this case in the second photoelectric element 40 corresponding to the intensity of the reflected light 52. The electrical signal is output if necessary amplified from the second photoelectric element 40 as a second measurement signal 62 which will be further explained with reference to FIG. 2.

In the embodiment, the light path between the light inlet opening 11 and the filter 20 is free from optical elements. Likewise, the light path between the filter 20 and the first photoelectric element 30 is free from optical elements. Moreover, the light path between the filter 20, to be more precise between the reflection surface 21 and the second photoelectric element 40 is free from optical elements. The entered light 50, the transmitted light 51, and the reflected light 52 thus each propagate in an uninfluenced manner. An influence of the intensity is at most performed by the filter 20 which, at the same time, functions as a beam splitter. There is no further influence by optical elements with exception of a medium-dependent attenuation during propagation.

The transmission function regarding the wavelength at the first photoelectric element 30 is applied to the second photoelectric element 40 by the reflection at the filter 20 in a wavelength-inverse manner.

Figure 2:
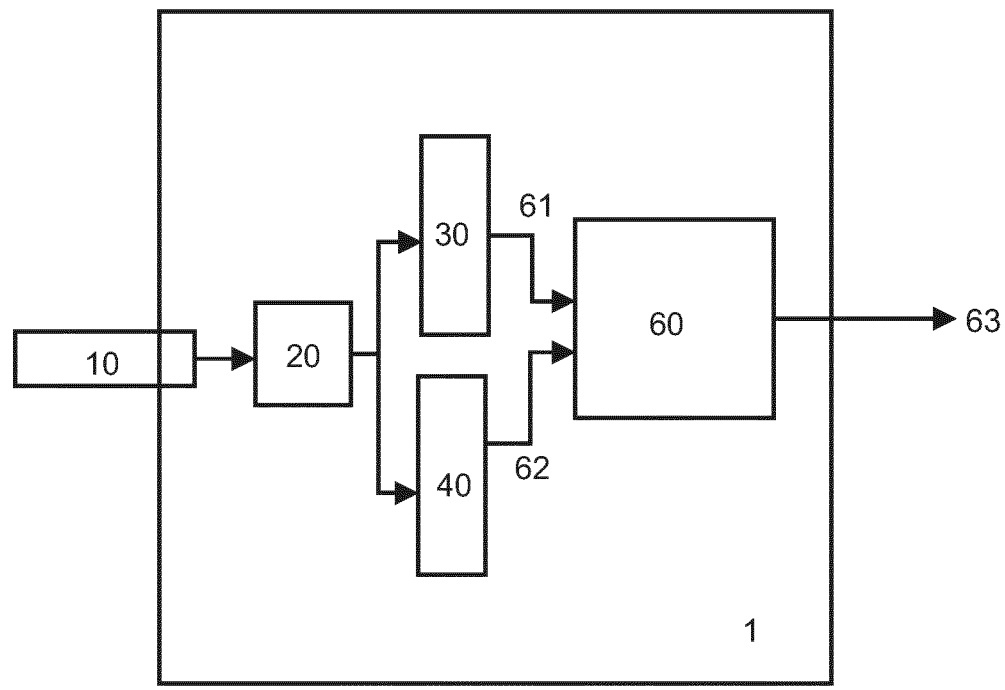
FIG. 2 a block diagram of an optoelectrical chip according to one embodiment, which further comprises an evaluation circuit.

FIG. 2 shows a block diagram of an optoelectrical chip 1, into which an evaluation circuit 60 is integrated in addition. The first measurement signal 61 from the first photoelectric element 30 and the second measurement signal 62 from the second photoelectric element 40 are supplied to the evaluation circuit 60. The evaluation circuit 60 divides the value of the first measurement signal 61 by the value of the second measurement signal 62. In this case, the second measurement signal 62 serves as a reference signal. The thus obtained quotient is a ratio value 63.

The ratio value 63 may be output directly as illustrated in FIG. 2. But the ratio value 63 may also be used internally in the evaluation circuit 60 to relate the ratio value 63 to a model of the filter 20 in order to obtain a value associated with the spectrum of the light 50 entering via the light inlet opening 11. The model of the filter 20, for example, is a calibrating model. The thus obtained value, for example, may indicate directly or indirectly the wavelength of the fiber Bragg grating in the optical waveguide 10. This value may be output, for example, additionally or alternatively to the ratio value 63.

Since no further beam splitter element is present in the light path and the reflected light 52 as well as the transmitted light 51 are subjected to energy conservation, an improved signal-to-noise ratio is yielded for the ratio value 63 as compared to the conventional chip 101.

Figure 3:
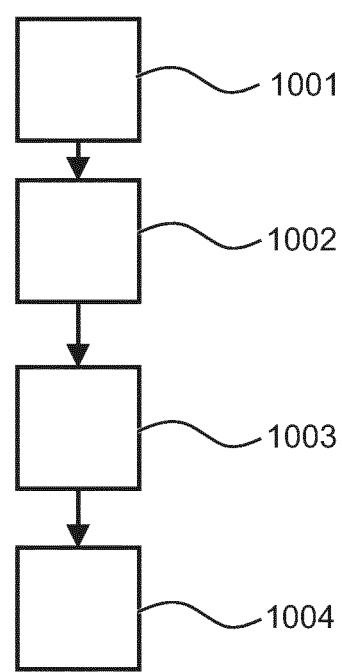
FIG. 3 a flow chart of a method for evaluating a reflection spectrum of a fiber Bragg grating according to one embodiment.
Figure 4:
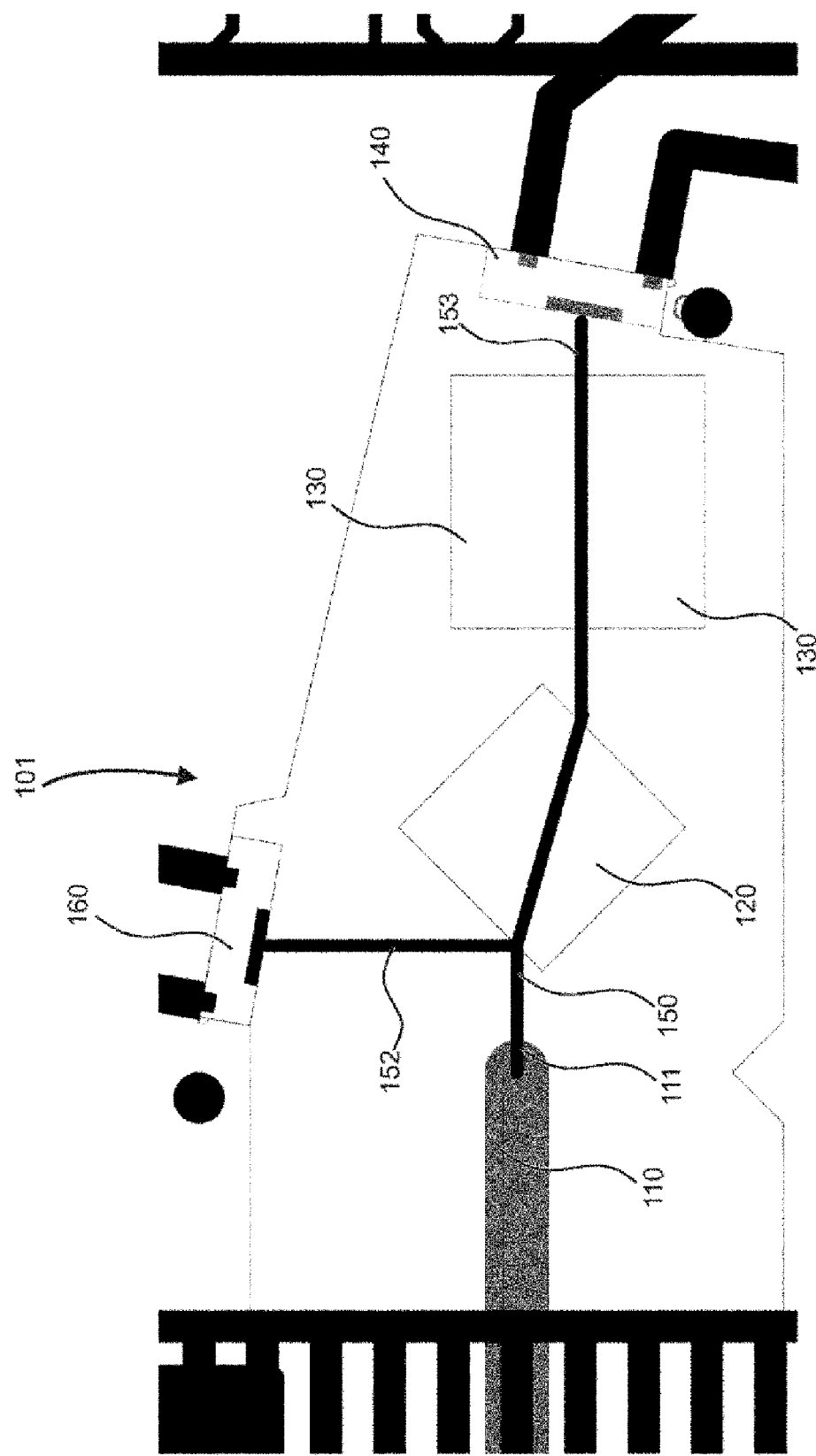
FIG. 4 a schematic representation of a conventional optoelectrical chip.

FIG. 3 shows a flow chart of a method for evaluating a reflection spectrum of a fiber Bragg grating, wherein the fiber Bragg grating is provided in an optical waveguide 10, and wherein an end of the optical waveguide is optically coupled to, for example inserted into, the light inlet opening 11 of the optoelectrical chip 1 according to one embodiment described herein.

In 1001, according to the method, a transmission intensity of the light 50 entered via the light inlet opening that had passed the optical filter 20 and hits the first photoelectric element 30 as a transmitted light 51 is first measured.

In 1002, a reflection intensity of the light 50 entered via the light inlet opening that had been reflected at the reflection surface 21 of the optical filter 20 and hits the second photoelectric element 40 as a reflected light 52 is measured.

In 1003, the transmission intensity is divided by the reflection intensity in order to obtain a ratio value.

In 1004, the ratio value is related to a model of the optical filter 20 in order to obtain a value associated with the reflection spectrum.

It should be noted at this point that the aspects and embodiments described herein are appropriately combinable with one another, and that single aspects may be omitted where it is reasonable and possible within the scope of skilled action. The skilled person is familiar with modifications and additions of the aspects described herein.

The invention claimed is:

1. A measurement system including:
    an optoelectrical chip comprising:
        a light inlet opening,
        a wavelength-sensitive optical filter,
        a first photoelectric element for measuring a first light intensity, the first photoelectric element being arranged such that light entering into the optoelectrical chip via the light inlet opening, which is transmitted by the optical filter, hits the first photoelectric element, and
        a second photoelectric element for measuring a second light intensity, the second photoelectric element being arranged such that light entering into the optoelectrical chip via the light inlet opening, which is reflected at the optical filter, hits the second photoelectric element; and
    an optical waveguide coupled to the light inlet opening, wherein the optical waveguide comprises at least one fiber Bragg grating,
    wherein a reflection surface of the optical filter is inclined at an angle relative to a propagation direction of the light entering into the optoelectrical chip via the light inlet opening, and wherein the angle is between 50 degrees and 80 degrees.

2. The measurement system according to claim 1, wherein the optical filter is a wavelength-sensitive transmission filter or edge filter.

3. The measurement system according to claim 1, wherein a light path from the light inlet opening to the optical filter, a light path from the optical filter to the first photoelectric element, and a light path from the optical filter to the second photoelectric element each are free from further optical elements.

4. The measurement system according to claim 1, further comprising an evaluation circuit to which a first measurement signal from the first photoelectric element and a second measurement signal from the second photoelectric element are supplied, wherein respective values of the first and second measurement signals are associated with the respective measured first and second light intensities,
    wherein the evaluation circuit is configured to divide a value of the first measurement signal by a value of the second measurement signal in order to obtain a ratio value.

5. The measurement system according to claim 4, wherein the evaluation circuit is further configured to relate the ratio value to a model of the optical filter in order to obtain a value associated with a spectrum of the light entering via the light inlet opening.

6. The measurement system according to claim 5, wherein the model of the optical filter comprises a calibrating model.

7. The measurement system according to claim 5, wherein the model of the optical filter comprises a look-up table.

8. The measurement system according to claim 1, wherein first photoelectric element is a first photodiode.

9. The measurement system according to claim 1, wherein second photoelectric element is a second photodiode.

10. The measurement system according to claim 1, wherein a light path from the light inlet opening to the optical filter, a light path from the optical filter to the first photoelectric element, and a light path from the optical filter to the second photoelectric element each are free from beam splitters.

11. A method for evaluating a reflection spectrum of a fiber Bragg grating, wherein the fiber Bragg grating is provided in an optical waveguide, and wherein an end of the optical waveguide is optically coupled to a light inlet opening of an optoelectrical chip,
    the optoelectrical chip comprising:
        a light inlet opening,
        a wavelength-sensitive optical filter,
        a first photoelectric element for measuring a first light intensity, the first photoelectric element being arranged such that light entering into the optoelectrical chip via the light inlet opening, which is transmitted by the optical filter, hits the first photoelectric element, and
        a second photoelectric element for measuring a second light intensity, the second photoelectric element being arranged such that light entering into the optoelectrical chip via the light inlet opening, which is reflected at the optical filter, hits the second photoelectric element, wherein a reflection surface of the optical filter is inclined at an angle relative to a propagation direction of the light entering into the optoelectrical chip via the light inlet opening, and wherein the angle is between 50 degrees and 80 degrees, and the method comprising:

measuring a transmission intensity of the light having entered via the light inlet opening and having passed the optical filter, by means of the first photoelectric element;

measuring a reflection intensity of the light having entered via the light inlet opening and having been reflected at the optical filter, by means of the second photoelectric element;

dividing the transmission intensity by the reflection intensity to obtain a ratio value; and relating the ratio value to a model of the optical filter to obtain a value associated with the reflection spectrum.

* * * * *